UNITED STATES PATENT OFFICE.

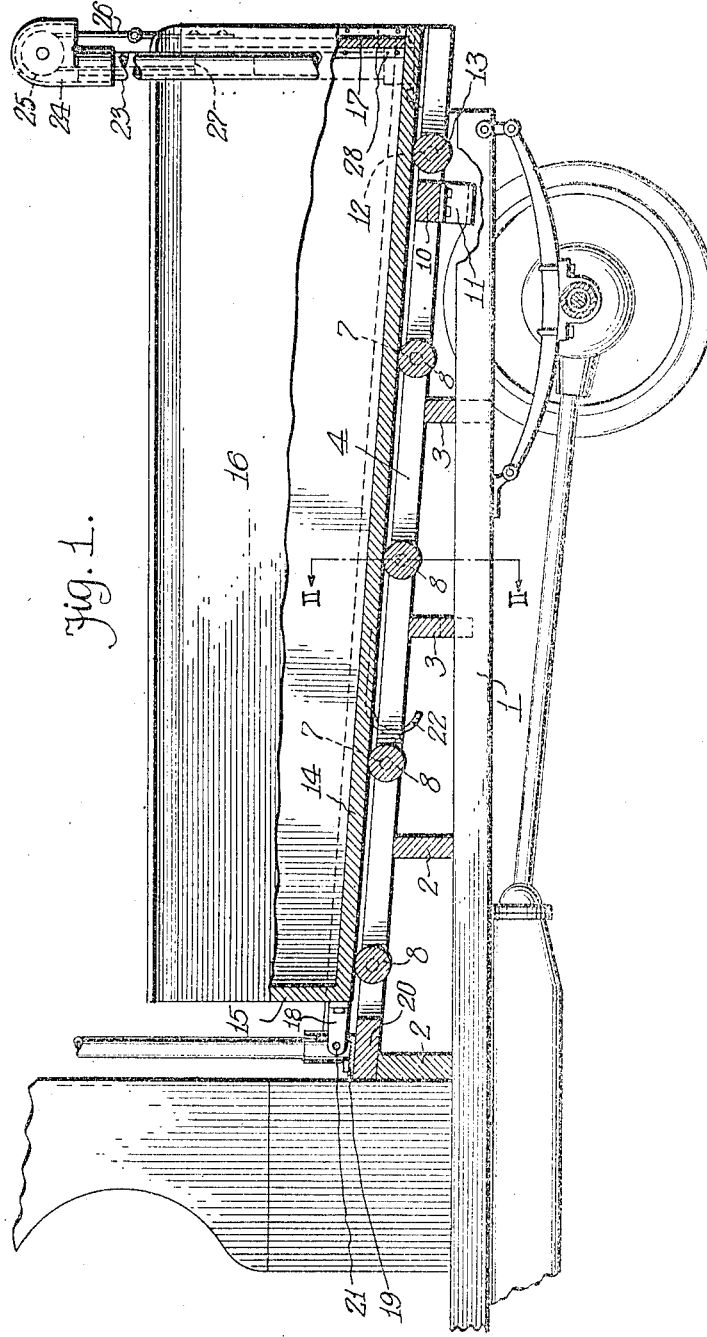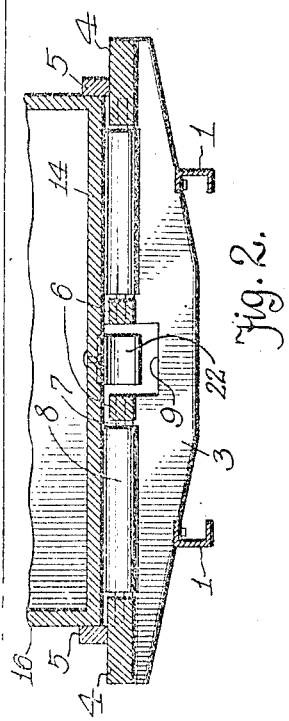

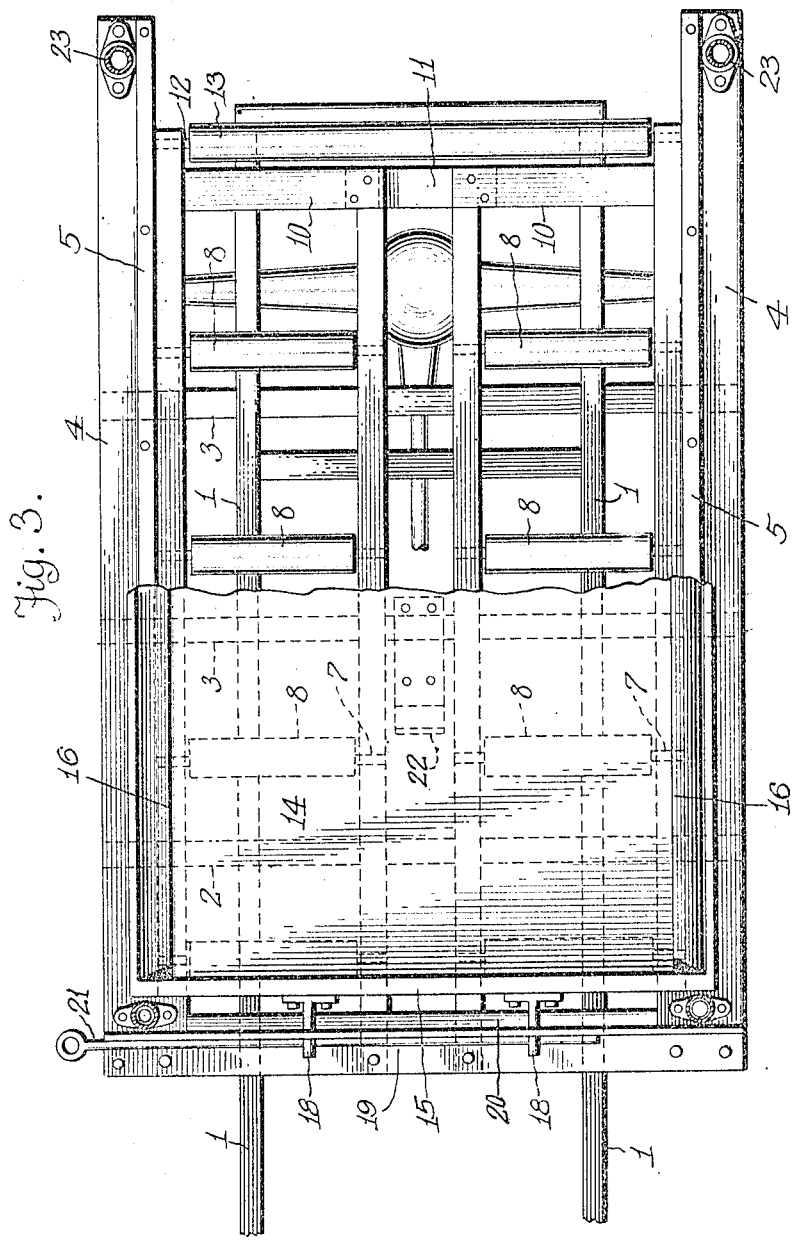

DANIEL J. LYNCH, OF HIGHLAND PARK, MICHIGAN.

DUMP-BODY.

1,291,574.

Specification of Letters Patent.   Patented Jan. 14, 1919.

Application filed July 8, 1918.   Serial No. 243,779.

*To all whom it may concern:*

Be it known that I, DANIEL J. LYNCH, a citizen of the United States of America, residing at Highland Park, in the county of Wayne and State of Michigan, have invented certain new and useful Improvements in Dump-Bodies, of which the following is a specification, reference being had therein to the accompanying drawings.

This invention relates to a dump body for trucks or other vehicles, and my invention aims to provide a body which will discharge its load by gravity, the body assuming a position which permits of the entire contents thereof being easily and quickly dumped.

My invention further aims to provide a dump body that is normally supported at an inclination to a vehicle frame or chassis, so that the body may slide rearwardly and overbalance to discharge its load, the body being manually restored to normal position and locked against accidental displacement.

My invention still further aims to accomplish the above results by a simple, durable and inexpensive body construction that will be hereinafter specifically described and then claimed, and reference will now be had to the drawings, wherein—

Figure 1 is a side elevation of a portion of a vehicle provided with the dump body in accordance with my invention, the dump body being partly broken away and partly in section;

Fig. 2 is a cross sectional view of the same taken on the line II—II of Fig. 1, and Fig. 3 is a plan of the body partly broken away.

In the drawings, the reference numeral 1 denotes a truck frame or chassis provided with transverse spaced bolsters 2 and 3, said bolsters being of various depths or gradually stepped down in height from the forwardmost bolster to the rearmost, so as to support inclined side frames 4 on the ends thereof. These side frames are provided with guide rails 5, and on the bolsters 2 and 3 are longitudinal spaced bearings 6, said bearings coöperating with the inner edges of the frames 4 in supporting the pintles 7 of rollers 8, said rollers projecting into a plane above that of the side frames 4.

The bolsters 3, between the bearings 6 have the upper edges thereof recessed, as at 9, and connecting the rear ends of the bearings 6 and the frames 4 are transverse braces 10 which have the confronting edges thereof connected by a strap or yoke 11.

Journaled in the rear ends of the frames 4 are the pintles 12 of a transverse roller 13 and said roller is adapted to coöperate with the rollers 8 in supporting the dump body.

The dump body comprises a bottom 14, a front wall 15, side walls 16, and a removable end gate 17. The body gradually increases in depth from the forward end thereof to the rear end and is normally held on the rollers 8 and 13 by a hold-fast device at the forward end of the body. The device comprises T irons 18 connected to the forward end of the body and adapted to project through a flange of an angle bar 19 mounted on a transverse brace 20 connecting the frames 4. The T irons 18 are apertured to receive a detachable rod 21 and with said rod in place at the front side of the angle bar 19, the dump body is prevented from sliding off of the rollers 8 and 13.

The bottom 14 of the dump body, adjacent the forward end thereof, has a hook shaped member 22, and when the dump body is released at the hold-fast device, the member 22 passes through the recesses 9 of the bolsters 3 and engages the roller 13, causing the dump body to tilt and discharge its contents. The strap or yoke 11 provides clearance for the hook shaped member 22 and said member is positioned so that by the time it reaches the roller 13 the greater part of the load overhangs the rear end of the vehicle frame or chassis 1, and is consequently unbalanced and tilts to discharge the load.

The rear ends of the frames 4 are provided with hollow uprights or weight wells 23 having housings 24 at the upper ends thereof for revoluble sheaves 25. Trained over the sheaves 25 are cables 26 provided with weights 27 and said cables are attached to the end gate 17, so that the weights may raise the end gate to permit of a load being discharged. The end gate 17 is slidable between guides 28 carried by the walls 16 of the dump body, and the end gate is elevated before the body is released.

It is thought that the utility of the invention will be apparent without further description and while in the drawing there is illustrated a preferred embodiment of the dump body, it is to be understood that the structural elements are susceptible to such changes in size, shape and manner of assemblage, as fall within the scope of the appended claims.

What I claim is:—

The combination of a vehicle chassis, bolsters thereon and some of said bolsters having the upper edges thereof recessed, inclined bearings on said bolsters, inclined frames on said bolsters at the outer sides of said bearings, revoluble rollers between said bearings and said frames, a revoluble roller between the rear ends of said frames, a strap connecting the rear ends of said bearings and alining with the recesses of said bolsters, a body on all of said rollers and having its rear end of greater depth than its forward end, a hold-fast device at the forward end of said body adapted to retain said body normally on said rollers, an end gate for said body, means on the rear ends of said frames adapted to support said end gate to be raised and lowered relative to said body and independent of said body, and means carried by said body adapted to pass through the recesses of said bolsters and said strap to engage the last mentioned roller and cause said body to tilt and discharge its contents.

In testimony whereof I affix my signature in the presence of two witnesses.

DANIEL J. LYNCH.

Witnesses:
ANNA M. DORR,
KARL H. BUTLER.